US009933033B2

(12) United States Patent
Comenduli et al.

(10) Patent No.: US 9,933,033 B2
(45) Date of Patent: Apr. 3, 2018

(54) PAD REPLACEMENT KIT, CALIPER BODY, PAD AND INSERT ASSEMBLY AND METHOD OF EXERTING A MODIFIED BRAKING ACTION

(71) Applicant: FRENI BREMBO S.P.A., Curno, Bergamo (IT)

(72) Inventors: Alberto Comenduli, Bergamo (IT); Hector Rodriguez Facundo, Bergamo (IT); Carlo Cantoni, Bergamo (IT); Roberto Arienti, Bergamo (IT)

(73) Assignee: Freni Brembo S.P.A., Curno, Bergamo (IT)

( * ) Notice: Subject to any disclaimer, the term of this patent is extended or adjusted under 35 U.S.C. 154(b) by 0 days.

(21) Appl. No.: 14/896,054

(22) PCT Filed: Jun. 6, 2014

(86) PCT No.: PCT/IB2014/062003
§ 371 (c)(1),
(2) Date: Dec. 4, 2015

(87) PCT Pub. No.: WO2014/195910
PCT Pub. Date: Dec. 11, 2014

(65) Prior Publication Data
US 2016/0131213 A1 May 12, 2016

(30) Foreign Application Priority Data

Jun. 6, 2013 (IT) .............................. MI2013A0929
Jun. 6, 2013 (IT) .............................. MI2013A0931

(51) Int. Cl.
*F16D 65/18* (2006.01)
*F16D 65/62* (2006.01)
(Continued)

(52) U.S. Cl.
CPC ............. *F16D 65/18* (2013.01); *F16D 65/62* (2013.01); *F16D 2055/002* (2013.01); *F16D 2127/10* (2013.01)

(58) Field of Classification Search
CPC .... F16D 65/18; F16D 65/62; F16D 2055/002; F16D 2127/10
See application file for complete search history.

(56) References Cited

U.S. PATENT DOCUMENTS 5,515,949 A * 5/1996 Baumgartner .......... F16D 65/18
188/106 F
5,582,273 A * 12/1996 Baumgartner .......... F16D 65/18
188/106 F
(Continued)

FOREIGN PATENT DOCUMENTS

DE 1253968 11/1967
DE 29901831 5/1999
(Continued)

OTHER PUBLICATIONS

International Search Report for PCT/IB2014/062003 dated Oct. 23, 2014.
(Continued)

*Primary Examiner* — Vishal R Sahni
(74) *Attorney, Agent, or Firm* — Thomas Horstemeyer, LLP (57) ABSTRACT

A caliper assembly (100) of a disc brake caliper, of the type with a modified braking action, comprising a caliper body (1) suitable to arrange astride of a brake disc, at least one first pad (8) being slidably received in at least one first seat (101) and so as to position itself between a first vehicle side elongated portion (5) and a first braking surface of the brake disk to abut, with a first pad plane (128) thereof, against said first braking surface (3) and to exert a braking action on the brake disc when pressed by the thrust means upon demand
(Continued)

for a first friction action exerted by the first pad friction material against said first braking surface (3) causing a braking action, said assembly (100) further comprising a first insert (106) in a separate body from said caliper body (1) and in a separate body to said first pad (8) and particular in a separate body to said first pad plate (102), said first insert (106) comprises a balance wheel body (119) hinged to the caliper body (1) and oscillating in relation to the caliper body (1) so as to change, in an adjustable manner avoiding replacement of the insert, the angle between the plate support surface (107) of said insert (106) and said plane (104) defined by the braking surface (3) or said pad plane (128).

17 Claims, 6 Drawing Sheets (51) Int. Cl.
*F16D 55/00* (2006.01)
*F16D 127/10* (2012.01)

(56) References Cited

U.S. PATENT DOCUMENTS

| | | | | |
|---|---|---|---|---|
| 2005/0109566 | A1* | 5/2005 | Baumann | F16D 65/18 188/71.8 |
| 2005/0145449 | A1* | 7/2005 | Jelley | F16D 49/20 188/72.7 |
| 2008/0190717 | A1* | 8/2008 | Baumann | F16D 65/18 188/156 |
| 2009/0095580 | A1* | 4/2009 | Baier-Welt | F16D 65/18 188/72.8 |
| 2010/0025165 | A1* | 2/2010 | Utzt | F16D 65/18 188/71.8 |
| 2010/0044166 | A1* | 2/2010 | Baumann | F16D 65/18 188/72.2 |
| 2011/0048872 | A1* | 3/2011 | Miura | F16D 65/18 188/72.4 |

FOREIGN PATENT DOCUMENTS

| | | |
|---|---|---|
| EP | 0641949 A1 | 3/1995 |
| EP | 0654615 A1 | 5/1995 |
| KR | 20100005988 A | 1/2010 |
| WO | 2007003326 | 1/2007 |
| WO | 2013007102 | 1/2013 |

OTHER PUBLICATIONS

Italian Search Report for IT 102013902162905 dated Feb. 13, 2014.
Italian Search Report for IT 102013902162907 dated Mar. 10, 2014.
English Translation of the Abstract for EP 0654615 dated Mar. 24, 1995.
English Translation of the Abstract for KR 20100005988 dated Jan. 18, 2010.
English Translation of the Abstract for EP 0641949 dated Mar. 8, 1995.

* cited by examiner

PAD REPLACEMENT KIT, CALIPER BODY, PAD AND INSERT ASSEMBLY AND METHOD OF EXERTING A MODIFIED BRAKING ACTION

CROSS-REFERENCE TO RELATED APPLICATION

This application is the 35 U.S.C. § 371 national stage application of PCT Application No. PCT/IB2014/062003, filed Jun. 6, 2014, which claims priority to and the benefit of, IT Patent Application No. MI2013A000929, filed Jun. 6, 2013, and IT Patent Application No. MI2013A000931, filed Jun. 6, 2013, all of which are herein incorporated by reference in their entirety.

FIELD OF THE INVENTION

The present invention relates to a replacement kit of the material subject to wear, or pads, and also to a method of exerting a modified braking action, for example on a vehicle.

In particular, the present invention relates to a caliper assembly of a disc brake caliper, comprising a caliper body suitable for positioning astride a brake disc having opposed braking surfaces.

Said caliper body comprises a first vehicle side elongated portion, suitable to face a first braking surface of the brake disc. Said vehicle side elongated portion comprises thrust means for exerting a stress on a pad, to abut it against said first braking surface. To such purpose, said first elongated portion comprises at least a first seat having at least a first seat support wall.

Said first seat is suitable to receive said at least one first pad having a first pad plate on which the friction material is placed, defining a first pad plane suitable to face and position itself substantially parallel to said first plane defined by the first braking surface.

Said at least one first pad is slidably received in said at least one first seat of the elongated body so as to position itself between said first vehicle side elongated portion and said first braking surface of the disc to abut with said first pad plane thereof against said first braking surface to exert a braking action on the brake disc when influenced by the thrust means upon demand for a first friction action exerted by the first pad friction, material against said first braking surface and thus determining a braking action on the vehicle.

STATE OF THE ART

It is known that during a braking action, the pad abuts against the braking surfaces of the brake disc and, thanks to the friction action between the friction material of the pad and the braking surface of the disc, exerts a braking action on the vehicle.

The friction action leads the pad to abut laterally against the caliper body. It is known that during the braking action, by abutting against the caliper body surfaces the pad may undergo orientations in relation to the brake disc such as to result in uneven wear of the friction material.

It is also known that by applying thrust stresses of the pad against an uneven braking surface the pad may stick against the braking surface of the brake disc amplifying the braking action.

The document EP0654615 of KNORR BREMSE SYSTEME discloses a pad having a plate having two lateral guides which, to prevent an oblique circumferential wear from occurring, are an oblique shape forming an acute angle with the surface of the friction material designed to come into contact with the braking surface of the brake disc, in particular an oblique surface which decreases downwards in the brake actuation direction and the slope which is chosen such as to be at least as great as the angle of friction.

The document KR20100005988 of HYUNDAI MOTOR CO LTD discloses a disc brake caliper to simplify the configuration of a braking system and improve the braking power even further by adding a pressure in an inclined tightening towards the disc to the pressure due to the hydraulic pressure load of the brake pump. This caliper disc brake is composed of a rear plate, a shoe, and a disc. The back plate is slidably inserted into a slide. A shoe is attached to the rear plate. The rear plate and the shoe are made to slide by hydraulic pressure and are clamped against the disc. The sliding path of the back plate is inclined forming an acute angle in relation to the friction surface of the disc on the abutment side of the pad to the caliper body.

From the documents of the prior art such as DE 12 53 968 of Teves, WO2013/007102 of Wuhan Yuanfeng Auto Parts Company Ltd., WO2007/003326or Knorr Bremse Systeme, it is known of to insert wedges formed integrally with the caliper body or in one piece with the plates of the pads so as to arrange the position of the support surface between the pads-caliper body, narrowing the space present between the caliper body and the disc to increase the thrust of the pad against the braking surface of the disc gradually as it abuts against the caliper body and finds a surface which gradually moves it towards the brake disc.

This state of the art offers these solutions primarily to correct asymmetries present in the equilibrium of the forces exerted between the caliper and its actuator means, and the pad and the disc.

However, none of these known solutions suggests how to modify the braking action to equalize the wear of the friction material of the pad or modify the braking action in a controlled manner, for example of a caliper coupled to a single wheel of a vehicle or of calipers coupled to only one side of the vehicle.

SOLUTION

The purpose of the present invention is thus to propose a caliper assembly kit that makes it possible to modify the braking action and in particular mainly so as to reduce the braking action in a selective manner.

A further purpose of the present invention is to propose a caliper assembly which makes it possible to adjust and, in accordance with a particular embodiment, to adjust in a controlled manner, the change in the reduction or extension of the braking action.

DRAWINGS

Further characteristics and advantages of the assembly according to the invention will, in any case, be evident from the description given below of its preferred embodiments, made by way of a non-limiting example with reference to the appended drawings, wherein.

DESCRIPTION OF SOME PREFERRED EMBODIMENT

Figure 2:
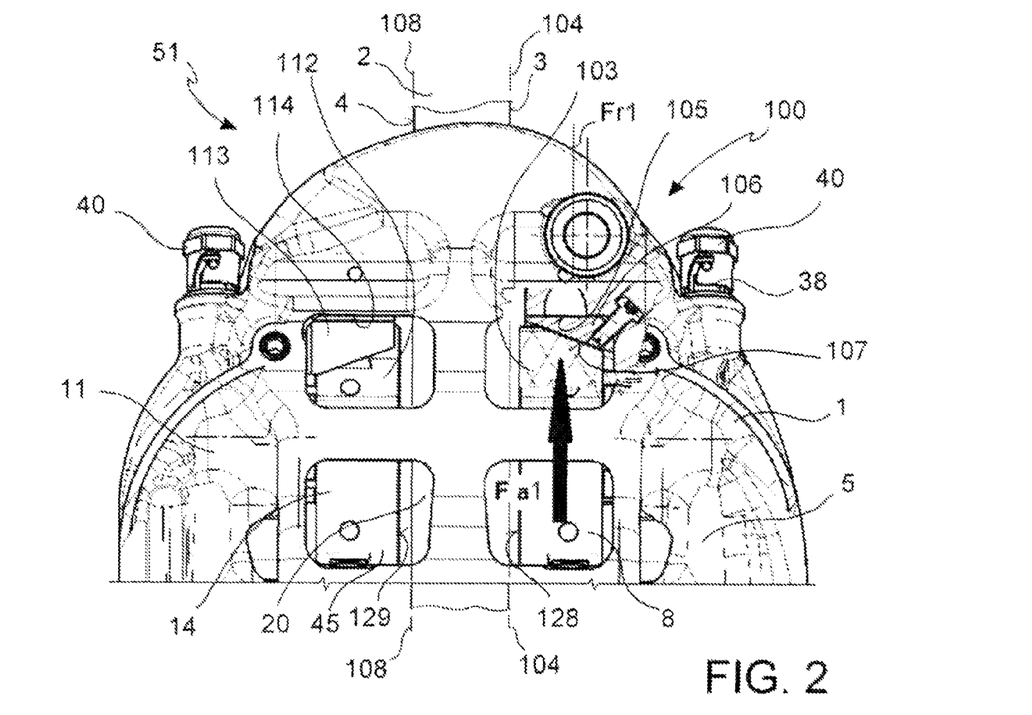
FIG. 2 is a view from above of a portion of caliper, pad and insert assembly placed astride a disc, according to a different embodiment.
Figure 3:
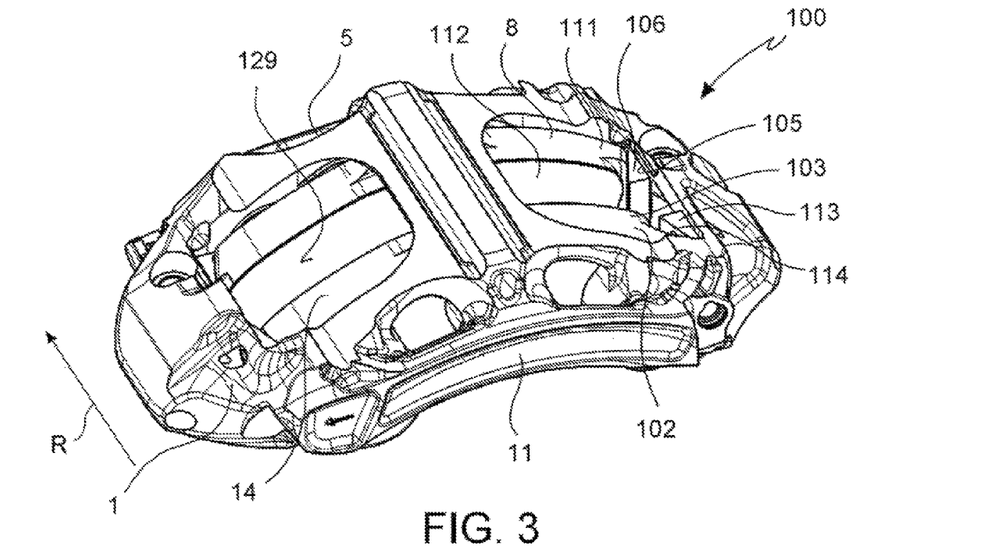
FIG. 3 is an axonometric view from the wheel side of a caliper, pad and insert assembly according to a further embodiment.
Figure 4:
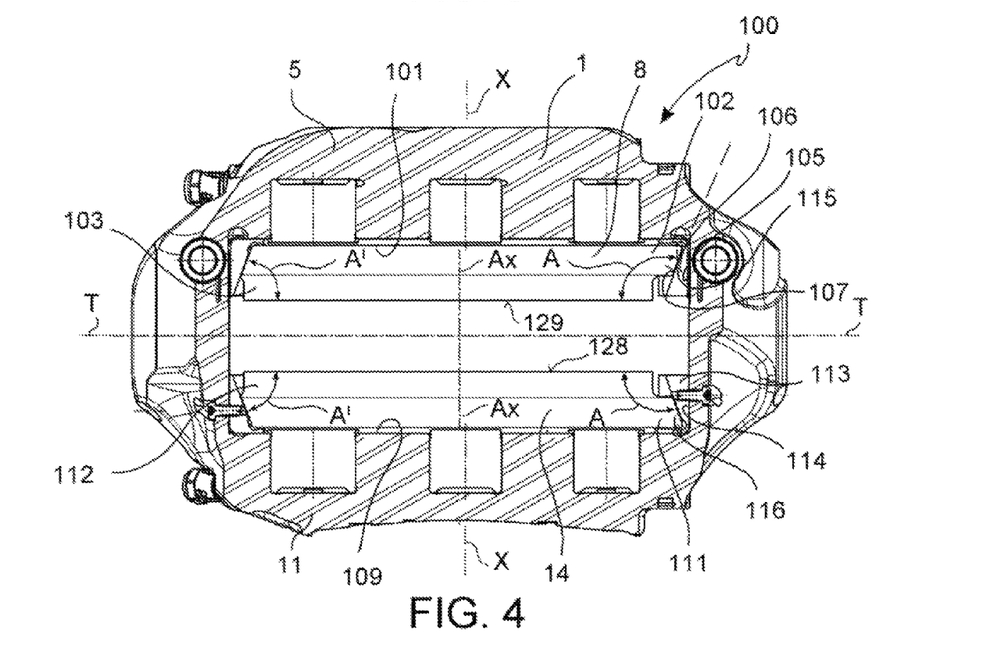
FIG. 4 is a cross-section view from above along a plane, containing the axes of the thrust means of the assembly in FIG. 3.
Figure 5:
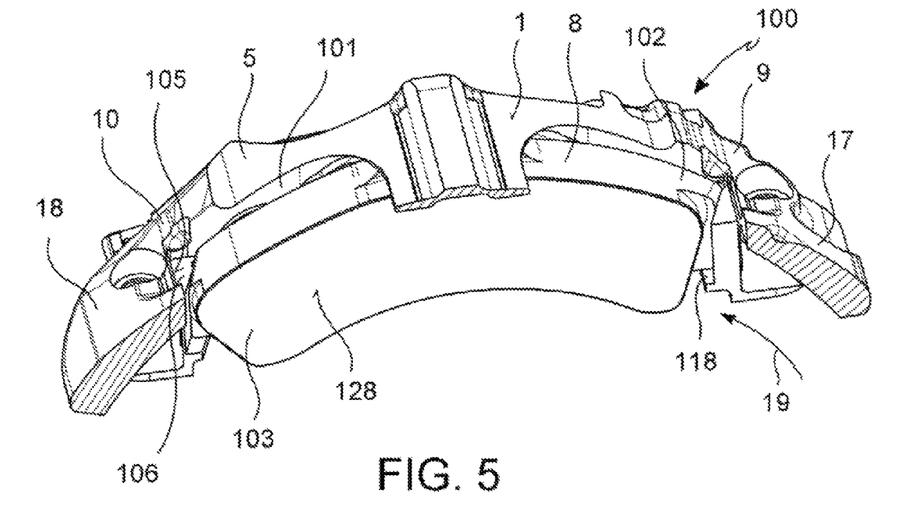
FIG. 5 is an axonometric view, cross-sectioned along a plane passing through the centreline of the caliper body, of an assembly according to FIG. 3.
Figure 6:
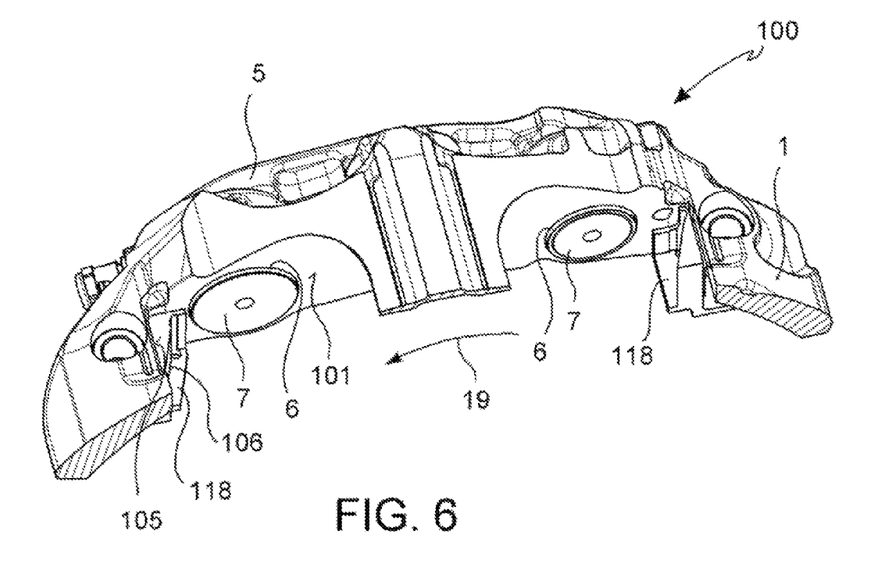
FIG. 6 is a cross-sectioned axonometric view of the assembly in FIG. 5, in which the pad has been removed to better show the housing seat of the pad itself and the inserts.
Figure 7:
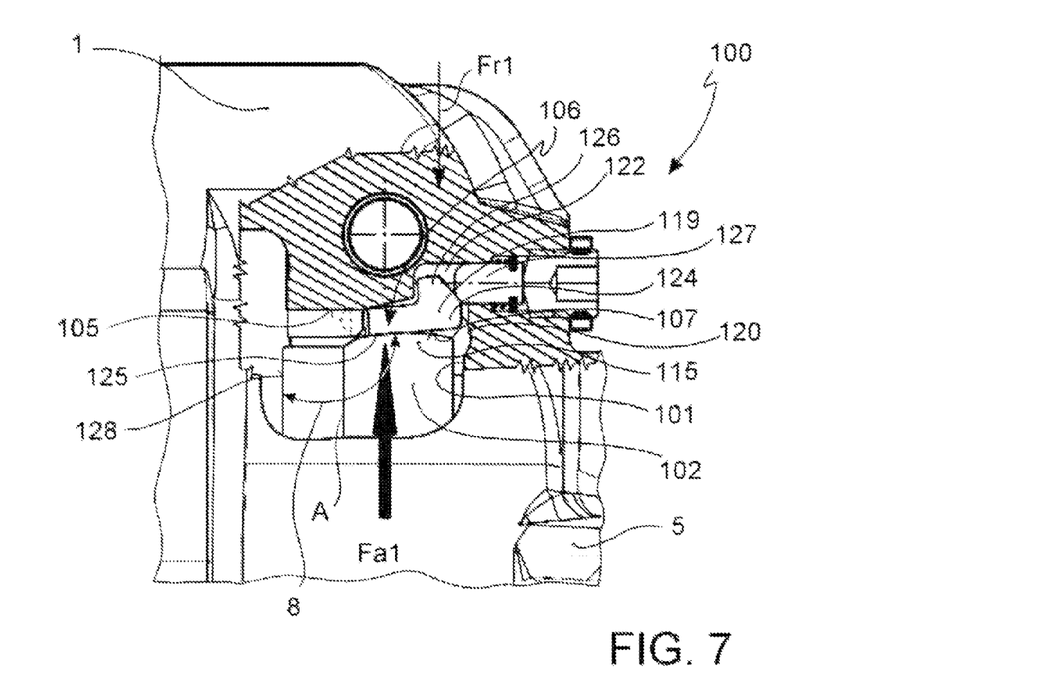
FIG. 7 is a view from above in partial cross-section of a detail of a caliper, pad and, insert assembly with adjustment means, according to a further embodiment.
Figure 8:
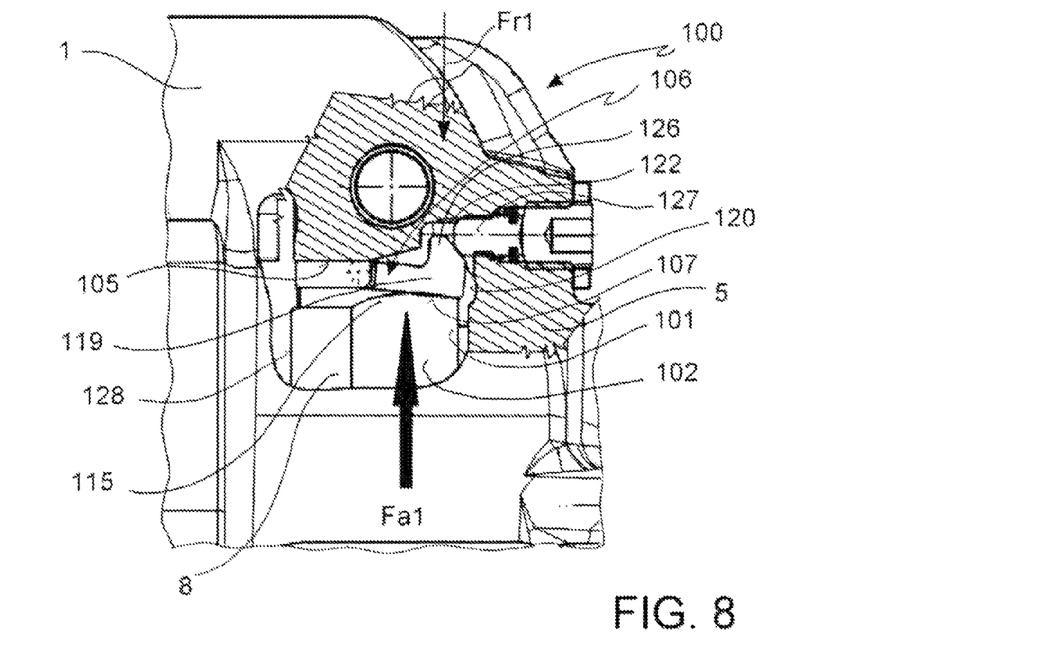
FIG. 8 is a view from above in partial cross-section of a detail of a caliper-body, pad and insert assembly with adjustment means, according to FIG. 7 and in a different functioning position.
Figure 9:
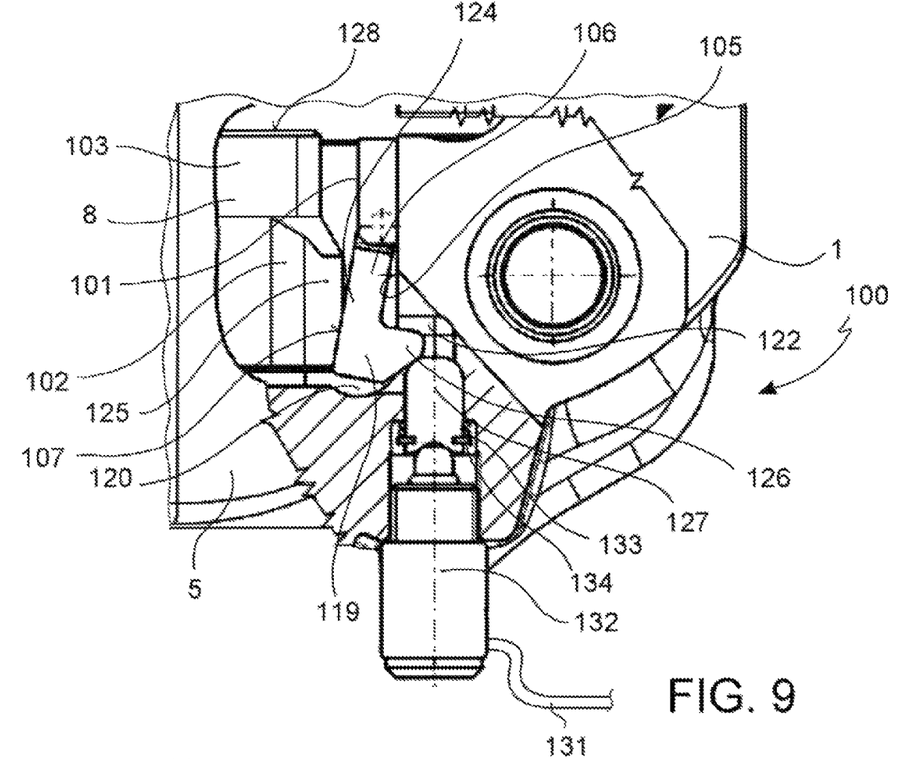
FIG. 9 is a view from above in partial cross-section of a detail of a caliper, pad and insert assembly with adjustment means.
Figure 10:
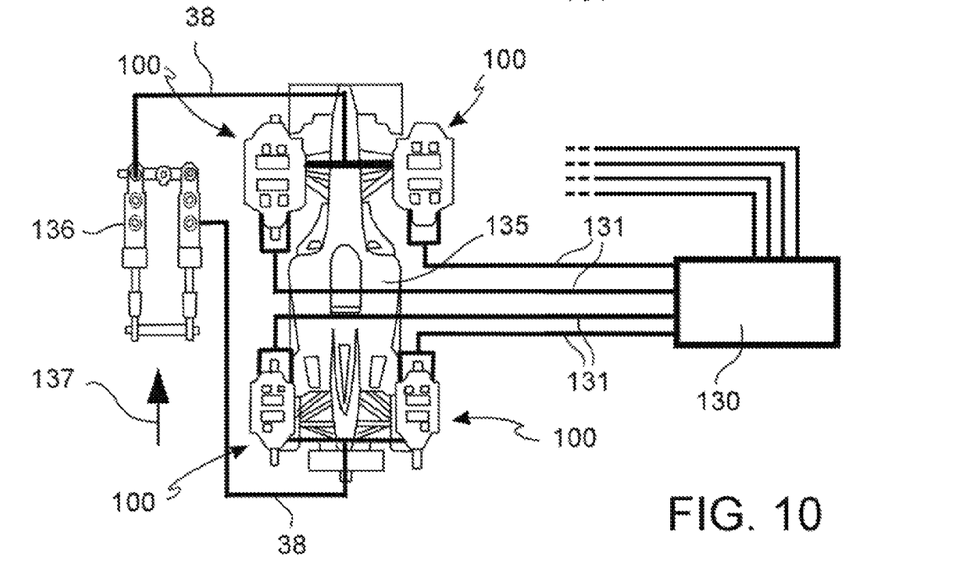
FIG. 10 shows in schematic form a vehicle to which four assemblies are joined schematically connected to a brake fluid supply device and to an adjustment device of the position of the inserts.
Figure 11:
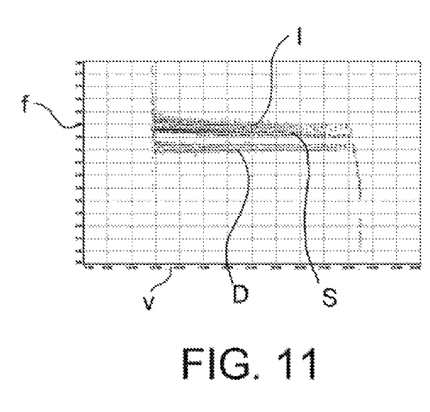
FIG. 11 is an experimental graph, showing trend curves of the friction (f) as a function of speed (v) in the case of a caliper without inserts (S), of a caliper with an insert capable of reducing the braking action (D) and a caliper with an insert capable of amplifying the braking (I)
Figure 12:
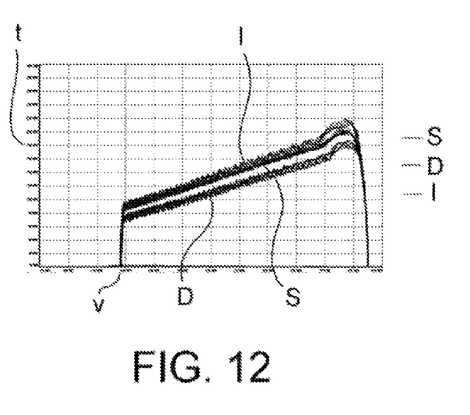
FIG. 12 is an experimental graph showing of torque (t), speed (v) curves relative to a caliper without inserts (S), a caliper having inserts for reducing the braking action (D) and lastly a caliper with inserts to amplify the braking actions(I).

With reference to the aforementioned figures, a caliper body 1 of a disc brake caliper 51 is suitable for being positioned astride a brake disc 2 [FIG. 2].

Said brake disc 2 has a first braking surface 3, or vehicle side braking surface and an opposite second braking surface 4, or wheel side braking surface.

Said braking surfaces 3, 4 are arranged substantially parallel and coaxial to a of rotation axis X-X of the brake disc 2.

Said of rotation axis X-X defines an axial direction Ax-Ax and a direction orthogonal thereto and directed radially to the disc R-R, as well as a further orthogonal, or circumferential, or tangential direction T-T to said brake disc 2.

Figure 1:
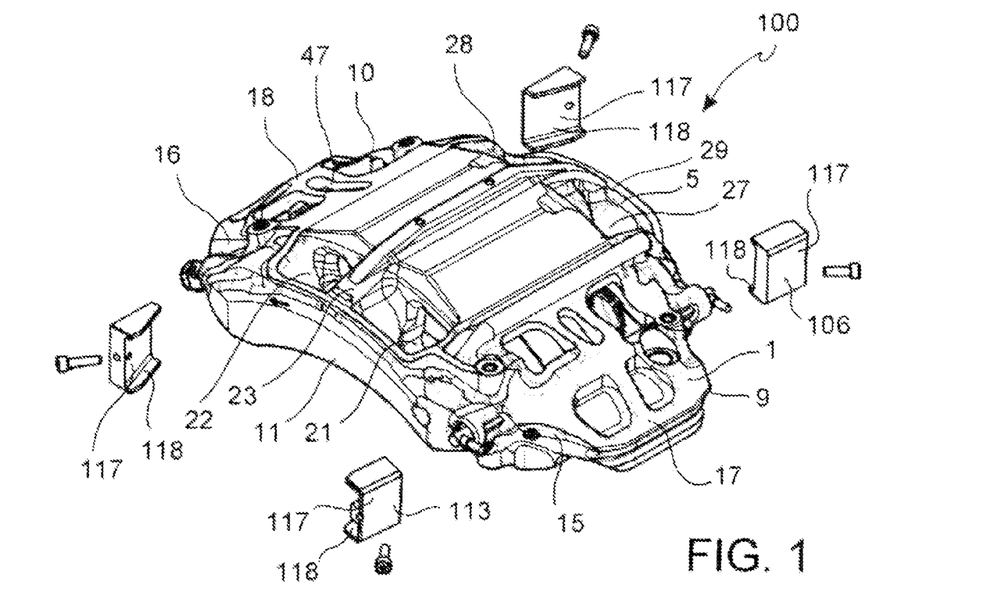
FIG. 1 is an axonometric view, in separate parts, of a caliper assembly for a disc brake comprising a caliper body and a series of inserts.

Said caliper body 1 comprises a first vehicle side elongated portion 5, which is suitable to face said first braking surface 3 of the brake disc 2 [from FIG. 1].

Said elongated portion 5 comprises at least a first vehicle side piston seat or vehicle side cylinder 6 which is suitable for housing a first piston 7. Said piston 7 can be stressed with a brake fluid coming out of said cylinder 6 to influence a first pad 8 suitable to be housed in said caliper body 1 between said first vehicle side elongated portion 5 and said first braking surface 3 of the brake disc 2 so as to abut against said first braking surface and exert thereon a braking action.

Said vehicle side elongated portion 5 has longitudinal extension in a circumferential direction T-T and comprises a first disc input side end 9 and an opposite second disc output side end 10.

According to one embodiment, said body 1 further comprises an opposite second wheel side elongated portion 11 suitable to face said opposite second braking surface 4 of the brake disc 2.

Said elongated portion 11 comprises at least a second wheel side piston seat or wheel side cylinder, suitable to house at least a second piston. Said second piston can be stressed with a brake fluid coming out of said cylinder so as to influence a second opposite pad 14 suitable to be housed in said caliper body 1 and positioned between said second wheel side elongated portion 11 and said opposite second braking surface 4 so as to abut against said second braking surface to exert a braking action on the brake disc 2.

Alternatively and according to a different embodiment, said first and second piston are stressed so as to influence said first and second opposite pad by means of an electromechanical actuator.

Said wheel side elongated portion 11 has a longitudinal extension in a circumferential direction T-T and comprises a first disc input end 15, as well as an opposite second disc output end 16.

Said body 1 further includes a first disc input connection bridge end 17 suitable to be arranged astride the brake disc 2 and connecting said first vehicle side disc input end 9 of said first vehicle side elongated portion 5 with said first wheel side disc input end 15 of said second wheel side elongated portion 11.

Said body 1 further includes a second disc output connection bridge end 18 suitable to be arranged astride the brake disc 2 and connecting said second vehicle side disc output end 10 of said first vehicle side elongated portion 5 with said second wheel side disc output end 16 of said second wheel side elongated portion 11.

Advantageously, said first and second elongated portion 5, 11 and said first and second end bridge 17, 18 form a yoke or yoke structure which delimits a housing channel for of a portion of the brake disc 19 which is suitable to accommodate or embrace a sector 20 of the brake disc 2 placing the caliper body 1 astride thereof.

According to one embodiment, said second wheel side elongated portion 11 comprises at least one wheel side opening 21 and/or 22 which places in communication said housing channel of the disc 19 with the outside of the wheel side caliper body 23 [FIG. 1]. According to one embodiment, said openings are delimited by walls which extend substantially axially, but also passing from a substantially axial direction next to the pad to a substantially radial direction next to the outer surface of the caliper body, or surface opposite the pad.

According to one embodiment, said at least one opening consists of two openings 21 and/or 22 which place in communication said housing channel of the disc 19 with the outside of the wheel side caliper body 23.

According to one embodiment, said first vehicle side elongated portion 5 also comprises at least one vehicle side opening 26 and/or 27 which places in communication said housing channel of the disc 19 with the outside of the vehicle side caliper body 28. According to one embodiment, said openings are delimited by walls which extend substantially axially, but also passing from a substantially axial direction next to the pad to a substantially radial direction next to the outer surface of the caliper body, or surface opposite the pad.

According to one embodiment, said at least one vehicle side opening consists of two openings 26 and/or 27 which place in communication said housing channel of the disc 19 with the outside of the vehicle side caliper body 28.

In particular, according to one embodiment, said two openings 26 and 27 are quite distinct from each other.

According to one embodiment, said first elongated portion 5 includes a third vehicle side piston seat or vehicle side cylinder, suitable to house a third vehicle side piston which can be stressed with a brake fluid coming out of said cylinder to influence a first pad 8 suitable to be housed in said caliper body 1 between said first vehicle side elongated portion 5 and said first braking surface 3 so as to abut against said first braking surface and exert a braking action on the brake disc 2.

According to one embodiment, said elongated portion 11 also comprises a fourth wheel side piston seat or wheel side cylinder, suitable to house a fourth piston which can be stressed with a brake fluid coming out of said cylinder to influence a second opposite pad 14 which is suitable to be housed in said caliper body 1 between said second wheel side elongated portion 11 and said opposite second braking surface 4 of the brake disc 2 so as to abut against said second braking surface and exert a braking action on the brake disc 2.

Alternatively and according to a different embodiment, said third and fourth pistons are stressed so as to influence said pads by means of an electromechanical actuator.

According to one embodiment, at least one of said end bridges 17 or 18 has a substantially radial opening 47 which places in communication said housing channel of the disc 19 with the outside of the caliper body 1.

According to one embodiment, a caliper assembly 100 for a brake disc, of the type with a modified braking action comprises a caliper body 1 suitable to be arranged astride a brake disc 2. Said brake disc 2 has a first braking surface 3, or vehicle side braking surface defining a first plane 104.

According to one embodiment, said caliper body 1 comprising a first vehicle side elongated portion 5 suitable to face said first braking surface 3 of the brake disc 2 comprising thrust means 7 housed therein.

According to one embodiment, said first elongated portion 5 comprises at least a first seat 101 having at least a first seat support wall 105. Said first seat 101 is suitable to receive at least a first pad 8 having a first pad plate 102 on which a first pad friction material 103 is placed, defining a first pad plane 128 suitable to face and position itself substantially parallel to said first plane 104 defined by the first braking surface.

According to one embodiment, said at least one first pad 8 is slidably received in said at least one first seat 101 and so as to position itself between said first vehicle side elongated portion 5 and said first braking surface 3 to abut, with said first pad plane 128 thereof, against said first braking surface 3 and to exert a braking action on the brake disc 2 when pressed by the thrust means 7 upon demand for a first friction action Fa1 exerted by the first pad friction material 103 against said first braking surface 3 causing a braking action.

According to one embodiment, said first pad plate 102 is suitable to abut against said at least one first seat support wall 105 to release onto said caliper body 1 a first reaction action Fr1 to said friction action.

According to one embodiment, said assembly 100 further comprises a first insert 106 in a separate body from said caliper body 1.

According to one embodiment, said assembly 100 further comprises a first insert 106 in a separate body from said first pad 8.

According to one embodiment, said assembly 100 further comprises a first insert 106 in a separate body from said first pad plate 102.

According to one embodiment, said first insert 106 comprises at least a first plate support surface 107.

According to one embodiment, said first insert 106 is positioned between said first pad seat support wall 105 of said first seat 101 provided in said first elongated portion 5 of the caliper body 1 and said first pad plate 102 of said first pad 8 so as to position said first plate support surface 107 substantially facing said first pad plate 102 and inclined in relation to said first plane 104 defined by the first braking surface 3 or in relation to said first pad plane 128.

According to one embodiment, said first plate support surface 107 of said first insert 106 is selectively positioned in relation to the caliper body 1, or said first pad plate 102, to form with said first plane 104 defined by the first braking surface, or said first pad plane 128, also an obtuse angle A, when measured open in front of the first pad 8, the extent of the angle A being selectable in a defined manner to change, for example reducing it, the braking action of said first pad 8 on said first braking surface 3 of the brake disc 2.

According to one embodiment, said body 1 further comprises an opposite second wheel side elongated portion 11 suitable to face a second, braking surface 4 of the brake disc 2 opposite said first braking surface 3 and defining a second plane 108.

According to one embodiment, said second elongated portion 11 comprises at least a second seat 109 having at least a second seat support wall 110.

According to one embodiment, said seat 109 is suitable to receive at least a second opposite pad 14 having a second pad plate 111 on which a second pad friction material 112 is placed, defining a second pad plane 129 suitable to face and position itself substantially parallel to said second plane 108 defined by the second braking surface.

According to one embodiment, said at least one second pad 14 is slidably housed in said at least one second seat 109 and so as to position itself between said second vehicle side elongated portion 11 and said second braking surface 4 to abut against said second braking surface and to exert a braking action on the brake disc 2 causing a second friction action Fa2 exerted by the second pad friction material 112 against said second braking surface 4 causing a braking action.

According to one embodiment, said second pad plate 111 is suitable to abut against said at least one second seat support wall 110 to release on said caliper body 1 a second reaction action Fr2 to said friction action.

According to one embodiment, said assembly 100 further comprises a second insert 113 in a separate body to said caliper body 1 and, for example in a separate body to said second pad 14 and, for example in a separate body to said second pad plate 111.

According to one embodiment, said second insert 113 comprising at least a second plate support surface 114.

According to one embodiment, said second insert 113 is positioned between said second pad seat support wall 110 of said second seat 109 provided in said second elongated portion 11 of the caliper body 1 and said second pad plate 111 of said second pad 14 so as to position said second plate support surface 114 facing said second pad plate 111 and inclined to said second plane 108 defined by the second braking surface 4 or second pad plane 129.

According to one embodiment, said second plate support surface 114 of said second insert 113 is selectively positioned in relation to the caliper body 1, or said second pad plate 111, to form with said second plane 108 defined by the second braking surface 4, or second pad plane 129, also an obtuse angle A, when measured open in front of the second pad 14, the extent of such angle being selectable in a defined manner to change, for example reducing it, the braking action of said second pad 14 on said second braking surface 4 of the brake disc 2.

According to one embodiment, said assembly 100 comprises a series of first and/or second inserts 106; 113, each suitable to form with said first and/or second plane 104; 108 defined by the first and/or second braking surface 3; 4 a different and predefined angle, when measured open in front of the first and/or second pad 8; 14, realising a kit for setting the caliper assembly 100 capable of exerting different and selected braking action changes.

According to one embodiment, said assembly 100 comprises a series of first and/or second inserts 106; 113 disposed on opposite sides of each pad.

According to one embodiment, the facing inserts positioned on opposite sides of each pad have plate support surfaces substantially parallel to each other.

According to one embodiment, each of said first and/or second inserts 106; 113 is suitable to form with said first and/or second plane 104; 108 defined by the first and/or second braking surface 3; 4 a predefined acute angle A', when measured open in front of the first and/or second pad 8; 14, to change, by broadening it, the braking action of said first and/or second pad 8; 14 on said first and/or second braking surface 3; 4 of the brake disc 2.

According to one embodiment, said first and/or second pad plate 102; 111 comprises a portion of first and/or second plate edge 115; 116 facing said first and/or second plate support surface 107; 114 of said first and/or second insert 106; 113.

According to one embodiment, said portion of first and/or second plate edge 115; 116 facing said first and/or second plate support surface 107; 114 is inclined so as to be substantially parallel to said first and/or second plate support surface 107; 114 of said first and/or second insert 106; 113.

According to one embodiment, each of said first and/or second inserts 106; 113 comprises an insert body 117 forming said first and/or second plate support surface 107; 114 suitable to face the pad 8; 14, said insert body 117 is connected to the caliper body 1.

According to one embodiment, said insert body 117 is removably connected to the caliper body 1 to be replaced during the service life of the caliper assembly 110 to change, by reducing or broadening it, the braking action of the pad 8 or 14 on the braking surface 3 or 4 of the brake disc 2.

According to one embodiment, said insert body 117 comprises insert wings 118 capable of embracing at least a portion of the pad edge and of guiding, for example supporting the pad in a radial direction R-R, the abutment of the pad against said plate support surface 107 or 114 of the insert 106 or 113.

According to one embodiment,—each of said first and/or second inserts 106; 113 comprises a balance wheel body 119, for example but not necessarily hinged to the caliper body 1 and oscillating in relation to the caliper body 1 so as to change, in an adjustable manner the angle between the plate support surface 107; 114 of said insert 106; 113 and said plane 104; 108 defined by the braking surface 3; 4 or said pad plane 128, 129.

According to one embodiment, said pad seat 101; 109 comprises a seat bottom wall 120; 121 and/or a seat support wall 105 in which a lowered portion or a housing 122; 123 is made, in which said balance wheel body 119 or oscillating means thereof are at east partially housed.

According to one embodiment, said balance wheel body 119 projects or recesses while oscillating in said lowered portion or housing 122; 123 at least with a transferor shaped portion thereof 124 following said plate support surface 107; 114.

According to one embodiment, said plate pad 102; 111 comprises a cam-shaped plate portion 125 forming a cam surface which, in any generatrix thereof forms said plate edge portion 115; 116 which forms said desired angle between the plate support surface 107; 114 of the balance wheel body insert 119 and said plane 104;108 defined by the braking surface 3; 4 or pad plane 128, 129.

According to one embodiment, said balance wheel body 119 comprises a shaped balance wheel thrust surface 126 influenced by an actuating member 127.

According to one embodiment, said balance wheel body 119 is supported rotatably with one of its specially rounded ends to seat 138 of a shaped block 139 attached to the caliper body 1.

According to one embodiment, said balance wheel body 119 is rotatably connected with a slot thereof to a pin fixed to a block in turn connected to the caliper body.

According to one embodiment, said balance wheel body 119 is rotatably connected with a slot thereof to a pin fixed directly to the caliper body.

According to one embodiment, said first or second pad plate 102, 111 have at the edge portion opposite to that of reaction to the tangential force, elastic means for example a spring, for example a leaf spring, which keep said pad "pushed" against said first or second insert 116, 113, to recover the clearance and keep said pad in abutment, preventing collisions and short delays in the braking action of the vehicle.

According to one embodiment, said balance wheel works with said shaped balance wheel thrust surface or a transferor surface thereof 126 in abutment against a plate support surface 107; 114, said plate support surface being cam-shaped so as to orient the thrust, during the rotation of the balance wheel, according to a predefined direction, for example, a direction forming the desired angle "A" in relation to said first or second pad plane 128, 129.

According to one embodiment, said inserts 106, 113 are provided on both sides of the said pad.

According to one embodiment, for example, said inserts 106, 113 provided on both sides of the same pad, from the disc input side form the aforesaid obtuse angle A, while from the disc output side they form an acute angle A' or vice versa.

According to one embodiment, the planes on the two inserts 106, 113 provided on both sides of the same pad are inclined, but substantially parallel to each other.

According to one embodiment, the pad support surfaces of the facing inserts of the same pad are substantially parallel.

According to one embodiment, said balance wheel 119 is selectively adjusted to its oscillation by an actuation member 127.

According to one embodiment, said actuation member comprises a pin, for example threaded, which moves, for example in a perpendicular direction to the pad, i.e. to the plane defined by the braking surface, and acts on an inclined plane of the balance wheel 119, by varying the angle A thereof.

According to one embodiment, said actuation member comprises a threaded screw 140 inserted in a threaded seat 141, made for example in the caliper body and positioned for example in a perpendicular direction to the pad, i.e. to the plane defined by the braking surface, opposed in its approach stroke to the balance wheel 119 by a spring 142 and fixed in the selected operating position by a lock nut 143 screwed onto the externally threaded shank of said screw and locked in abutment against the outer surface of the caliper body.

According to one embodiment, said actuation member comprises a threaded adjustment portion, screwed into the threaded seat of the caliper body so that it is accessible from outside the caliper body and is selectively adjustable in a defined manner with its micrometric advancement making it possible to adjust the angle A or A' of the balance wheel with extreme accuracy.

According to one embodiment, said actuation member is oriented so that its advancement or adjustment is substantially transversal to the plane defined by the braking surface or first or second, pad plane 128, 129. According to one embodiment, said actuation member works by making the balance wheel body of the insert influencing the plate towards or away from the disc during the braking action by making the pad abut against the caliper body, come out of/move backwards from/to the lowered or housing portion. According to one embodiment, said actuation member is a piston-cylinder group of the pneumatic or hydraulic or preferably but not necessarily, electric type, for example, a piezoelectric motor, optionally, but not necessarily operated in a controlled manner to control the advancement and thus the oscillation of the balance wheel.

According to one embodiment, a kit is provided for comprising at least one pad 8, 14 and a separate insert 106, 113 suitable to housed in a caliper body assembly 100.

According to one embodiment, said caliper body assembly 100 comprises:
 a caliper body 1 suitable to position itself astride a brake disc 2, the brake disc 2 having a first or second braking surface 3, 4, or vehicle side braking surface, defining a first or second plane 104, 108;
 said caliper body 1 comprising a first or second elongated portion 5, 11 suitable to face said first or second braking surface 3, 4 of, the brake disc 2 comprising thrust means 7 housed therein;
 said first or second elongated portion 5, 11 comprising at least a first or second seat 101, 109 having at least a first or second seat support wall 105, 114;
 said first or second seat 101, 109 being suitable to receive said at least one first or second pad 8, 14 having a first or second pad plate 102, 111 on which a first or second pad friction material 103, 112 is placed, defining a first or second pad plane 128, 129 suitable to face and position itself substantially parallel to said first or second plane 104, 108 defined by the first or second braking surface;
 said at least one first or second pad 8, 14 being suitable to be slidably received in said at least one first or second seat 101, 109 and so as to be position itself between said first or second elongated portion 5, 11) and said first or second braking surface 3, 4 to abut, with said first or second pad plane 128, 129 thereof, against said first or second braking surface 3, 4 and to exert a braking action on the brake disc 2 when influenced by the thrust means 7 upon the demand for a first or second friction action Fa1, Fa2 exerted by the first or second pad friction material 103, 112 against said first or second braking surface 3, 4 determining a braking action;
 said first or second pad plate 102, 111 being suitable to abut against said at least one first or second seat support wall 105, 110 to release onto said caliper body 1 a first or second reaction action Fr1, Fr2 to said friction action;

According to one embodiment, said kit comprises, besides said first or second pad 8, 14 said first or second insert 106, 113 in a separate body to said caliper body 1 and in a separate body to said first or second pad 8, 14 and in particular in a separate body to said first or second pad plate 102, 111.

According to one embodiment, said first or second insert 106, 113 of said kit comprises at least one first or second plate support surface 107, 114.

According to one embodiment,—said first or second kit insert 106, 113 is suitable to position itself between said first or second pad seat support wall 105, 110 of said first or second seat 101, 109 provided in said first or second elongated portion 5, 11 of the caliper body (1) and said first or second pad plate 102, 111 of said first or second pad 8, 14 so as to position said first or second plate support surface 107, 114 substantially facing said first or second pad plate 102, 111 and inclined to said first or second pad plane 128, 129.

According to one embodiment, said first or second plate support surface 107, 114 of said first or second kit insert 106, 113 is selectively positioned in relation to said first or second pad plate 102, 111 so as to form with said first or second pad plane 128, 129, also an obtuse angle A, when measured open in front of the first or second pad 8, 14, the extent of the angle A being selectable in a defined manner to change, also for example reducing it, the braking action of said first or second pad 8, 14 on said first or second braking surface 3, 4 of the brake disc 2).

A method of using the present invention will be described briefly below.

According to a possible use, inserts with predefined angles are joined, for example screwed, to the caliper body. During the life of the vehicle, for example, in the case of abnormal wear of the pads, or in the case of a vehicle intended for specific uses where a temporarily modified braking action is desired, the inserts and possibly the pads with the respective plates are replaced and this way the braking action is modified using the same caliper body.

According to a possible use, in case in which the balance wheel as described above is provided, the angle of the balance wheel is adjusted manually or with a special command, modifying the de-amplification or amplification of the braking action of said caliper body.

According to a possible use, in case in which the balance wheel as described above is provided, the angulation of the balance wheel is adjusted for example in a controlled manner and by a command, modifying the de-amplification or amplification of the braking action of said caliper body. This way the braking action may be controlled by means of the control unit of the vehicle and the braking action changed not only on the individual axis of the vehicle but also on the individual wheel of the vehicle, without thereby modifying the caliper body or brake pump of the vehicle.

Thanks to the embodiments described above, the brake caliper can be made to function as a caliper without inserts, and as required, inserts with different angles A or A' can be fitted on said caliper body to:

amplify the braking force generated;
deamplify, or reduce the braking force generated;
improve the evenness of wear of the friction material of the pads, for example, depending on the friction material used, there might be differentiated wear between the disc input and output preventing the formation of uneven wear or "slice of salami", which can be "corrected" with appropriate inserts housed on reaction shoulders of the pads provided on the caliper body.

Obviously, a person skilled in the art may make numerous modifications and variations to the assembly according to the invention so as to satisfy contingent and specific requirements while remaining within the sphere of protection of the invention as defined by the following claims.

For example, according to one embodiment, the adjustment of the oscillation of the balance wheel may take place with a commanded action and also alternatively with an action commanded in a controlled manner.

In this way, the system for implementing the adjustment of the balance wheels of reaction to tangential force can become the "active" type if operated through appropriate feedback control by means of a suitable electronic control unit. This way, for example, the deamplificazione can be exploited as a system implementing an ABS to prevent the wheels from locking during braking and the amplification or the deamplificazione can permit a variation of the braking force between the inside and outside of the vehicle to prevent the inner wheel from locking on curves.

Thanks to the present invention, the same caliper body can be used to:
  obtain a greater braking force, for example in the case in which a disc of a greater diameter than the design diameter is used and it is considered too expensive to develop a special caliper with a greater braking action, opting for the use of inserts able to amplify the braking action of a caliper body suitable for a disc of smaller diameter;
  to "correct" "salami slice" wear on the pads by the use of different friction material in case it should be too expensive to develop a new caliper with different position of the pistons, providing inserts able to "balance" the thrust of the pistons provided;
  reduce the residual torque de-amplifying the braking action.

For the same caliper body designed for average conditions of use, depending on the type of insert/position of the balance wheel used, an amplification of the braking action can be achieved or, with the simple replacement of the pad inserts kit or adjustment of the balance wheel, the reduction of the braking action, depending on the operating conditions or the more or less uniform wear of the pad or the journey to be tackled with the vehicle.

For example, in case of use in a sports car, it is possible to design the caliper, pad and inserts assembly for use with very severe braking and then, in the case of use of the sports cars in less demanding but longer circuits, by merely replacing the inserts or adjusting them it is possible to modify, reducing it, the braking action and ensure a longer life of the friction material.

According to one possible embodiment, inserts are provided with a low deamplification angle, of entities such that at the end of braking there is a "detachment" of the brake pad from the disc (by the action of the component in the direction opposite to the thrust of the pistons, given by the inclined deamplification plane).

According to yet a further embodiment, the caliper body is of the floating type and the insert or the balance wheel is provided on the mounting and pad support bracket.

According to one embodiment, the adjustment of the balance wheels is performed on predefined angular positions (intervening on the clamp each time, for example by screwing or unscrewing the nuts acting on the balance wheel).

According to one embodiment, the adjustment of the balance wheels is carried out continuously by means of electronically controlled micro— actuators, for example but not necessarily with actuators of the "active" type, so as to operate for example with the reduction of the amplification towards the end of braking to avoid locking of the wheel of the vehicle, for example by varying the distribution of braking force between the front and rear wheel or as the grip conditions on the axles change. For example, in the case of a vehicle having an aerodynamic effect which influences the friction between the wheels and the road, an effect which decreases with speed and consequently towards the end of braking requires a "lightening" of the braking action of the rear wheels for prevent them from locking. Another example of use is in braking when entering a curve, where the vertical load on the wheel on the inside of the curve tends to lighten leading to locking. The proposed active system makes it possible to de-amplify the inner side caliper and prevent the locking thereof or alternatively to amplify the wheels of the outer side of the vehicle.

According to a general embodiment, a caliper assembly 100 of a caliper for a disc brake, of the modified braking action type, comprises a caliper body 1 suitable to be arranged astride a brake disc 2, the brake disc 2 having a first braking surface 3, or vehicle side braking surface, defining a first plane 104. Said caliper body 1 comprises a first vehicle side elongated portion 5 suitable to face said first braking surface 3 of the brake disc 2 which comprises thrust means 7 housed therein; Said first elongated portion 5 comprises at least one first seat 101 having at least a first seat support wall 105. Said first seat 101 is suitable to receive at least a first pad 8 having a first pad plate 102 on which a first pad friction material 103 is placed, defining a first pad plane 128 suitable to face and position itself substantially parallel to said first plane 104 defined by the first braking surface; Said at least one first pad 8 being slidably received in said at least one first seat 101 and so as to position itself between said first vehicle side elongated portion 5 and said first braking surface 3 to abut, with said first pad plane 128 thereof, against said first braking surface 3 and to exert a braking action on the brake disc 2 when pressed by the thrust means 7 upon demand for a first friction action Fa1 exerted by the first pad friction material 103 against said first braking surface 3 causing a braking action. Said first pad plate 102 being suitable to abut against said at least one first seat support wall 105 to release onto said caliper body 1 a first reaction action Fr1 to said friction action.

Said assembly 100 further comprises a first insert 106 in a separate body from said caliper body 1 and in a separate body to said first pad 8 and particular in a separate body to said first pad plate 102. Said first insert 106 comprises at least a first plate support surface 107. Said first insert 106 being positioned between said first pad seat support wall 105 of said first seat 101 provided in said first elongated portion 5 of the caliper body 1 and said first pad plate 102 of said first pad 8 so as to position said first plate support surface 107 substantially facing said first pad plate 102 and inclined in relation to said first plane 104 defined by the first braking surface 3 or in relation to said first pad plane 128.

Advantageously, said first plate support surface 107 of said first insert 106 is selectively positioned in relation to the caliper body 1, or said first pad plate 102, to form with said first plane 104 defined by the first braking surface, or said first pad plane 128, also an obtuse angle "A", when measured on the abutment side of the pad to the caliper body and open in front of the first pad 8, the extent of the angle A being selectable in a defined manner to change, for example reducing it, the braking action of said first pad 8 on said first braking surface 3 of the brake disc 2.

According to a further embodiment,—said body 1 further comprises an opposite second wheel side elongated portion 11 suitable to face a second braking surface 4 of the brake disc 2 opposite said first braking surface 3 and defining a second plane 108.

According to a further embodiment, said second elongated portion 11 comprises at least a second seat 109 having at least a second seat support wall 110.

According to a further embodiment, said seat 109 being suitable to receive at least a second opposite pad 14 having a second pad plate 111 on which a second pad friction material 112 is placed, defining a second pad plane 129 suitable to face and position itself substantially parallel to said second plane 108 defined by the second braking surface.

According to a further embodiment, said at least one second pad 14 being slidably housed in said at least one second seat 109 and so as to position itself between said second vehicle side elongated portion 11 and said second braking surface 4 to abut against said second braking surface and to exert a braking action on the brake disc 2 causing a second friction action Fa2 exerted by the second pad friction material 112 against said second braking surface 4 causing a braking action.

According to a further embodiment, said second pad plate 111 being suitable to abut against said at least one second seat support wall 110 to release on said caliper body 1 a second reaction action Fr2 to said friction action.

According to a further embodiment, said assembly 100 further comprising a second insert 113 in a separate body from said caliper body 1 and in a separate body to said second pad 14 and particular in a separate body to said second pad plate 111.

According to a further embodiment, said second insert 113 comprising at least a second plate support surface 114.

According to a further embodiment, said second insert 113 is positioned between said second pad seat support wall 110 of said second seat 109 provided in said second elongated portion 11 of the caliper body 1 and said second pad plate 111 of said second pad 14 so as to position said second plate support surface 114 facing said second pad plate 111 and inclined to said second plane 108 defined by the second braking surface 4 or second pad plane 129.

According to a further embodiment, said second plate support surface 114 of said second insert 113 is selectively positioned in relation to the caliper body 1, or said second pad plate 111, to form with said second plane 108 defined by the second braking surface 4, or second pad plane 129, also an obtuse angle, when measured on the abutment side of the pad to the caliper body and open in front of the second pad 14, the extent of such angle being selectable in a defined manner to change, reducing it, the braking action of said second pad 14 on said second braking surface 4 of the brake disc 2.

According to a further embodiment, said insert 106; 113 is an interchangeable wedge inserted interposed between said pad seat support wall 105, 110 and said pad plate 102, 111.

According to a further embodiment, said assembly 100 comprises a series of first and/or second inserts 106; 113, each suitable to form with said first and/or second plane 104; 108 defined by the first and/or second braking surface 3; 4 a different and predefined angle, when measured open in front of the first and/or second pad 8; 14, realising a kit for setting the caliper assembly 100 capable of exerting different and selected braking action changes.

According to a further embodiment, each of said first and/or second inserts 106; 113 is suitable to form with said first and/or second plane 104; 108 defined by the first and/or second braking surface 3; 4 a predefined acute angle A', when measured open in front of the first and/or second pad 8; 14, to change, by broadening it, the braking action of said first and/or second pad 8; 14 on said first and/or second braking surface 3; 4 of the brake disc 2.

According to a further embodiment, said first and/or second pad plate 102; 111 comprises a portion of first and/or second plate edge 115; 116 facing said first and/or second plate support surface 107; 114 of said first and/or second insert 106; 113.

According to a further embodiment, said portion of first and/or second plate edge 115; 116 facing said first and/or second plate support surface 107; 114 is inclined so as to be substantially parallel to said first and/or second plate support surface 107; 114 of said first and/or second insert 106; 113.

According to a further embodiment, each of said first and/or second inserts 106; 113 comprises an insert body 117 forming said first and/or second plate support surface 107; 114 suitable to face the pad 8; 14, said insert body 117 is connected to the caliper body 1.

According to a further embodiment, said insert body 117 is removably connected to the caliper body 1 to be replaced during the service life of the caliper assembly 110 to change, by reducing or broadening it, the braking action of the pad 8 or 14 on the braking surface 3 or 4 of the brake disc 2.

According to a further embodiment, said insert body 117 comprises insert wings 118 capable of embracing at least a portion of the pad edge and of guiding the abutment of the pad against said plate support surface 107 or 114 of the insert 106 or 113.

According to a further embodiment,—each of said first and/or second inserts 106; 113 comprises a balance wheel body 119 hinged to the caliper body 1 and oscillating in relation to the caliper body 1 so as to change, in an adjustable manner avoiding the replacement of the insert, the angle between the plate support surface 107; 114 of said insert 106; 113 and said plane 104; 108 defined by the braking surface 3; 4 or said pad plane 128, 129.

According to a further embodiment, said pad seat 101; 109 comprises a seat bottom wall 120; 121 and/or a seat support wall 105, 110 in which a lowered portion or a housing 122; 123 is made, in which said balance wheel body 119 is housed, and possibly oscillating means thereof.

According to a further embodiment, said balance wheel body 119 projects or recesses while oscillating in said lowered portion or housing 122; 123 at least with a transferor shaped portion thereof 124 following said plate support surface 107; 114.

According to a further embodiment, said plate pad 102; 111 comprises a cam-shaped plate portion 125 forming a cam surface which, in any generatrix thereof forms said plate edge portion 115; 116 which forms said desired angle between the plate support surface 107; 114 of the balance wheel body insert 119 and said plane 104;108 defined by the braking surface 3; 4 or pad plane 128, 129.

According to a further embodiment, said balance wheel body 119 comprises a shaped balance wheel thrust surface 126 influenced by an actuating member 127. 8. Caliper assembly 100 according to any of the previous claims, wherein said balance wheel works with the transferor surface thereof abutting against the plate support surface 107; 114, said plate support surface being cam-shaped so as to orient the thrust, during the rotation of the balance wheel, according to a predefined direction, for example, a direction forming the desired angle in relation to said first or second pad plane 128, 129.

According to a general embodiment, a kit comprising at least one pad 8, 14 and an insert 106, 113 suitable to be housed in a caliper body assembly 110, said caliper body assembly 100 comprising:

- a caliper body 1 suitable to position itself astride a brake disc 2, the brake disc 2 having a first or second braking surface 3, 4, or vehicle side braking surface, defining a first or second plane 104, 108;
- said caliper body 1 comprising a first or second elongated portion 5, 11 suitable to face said first or second braking surface 3, 4 of the brake disc 2 comprising thrust means 7 housed therein;
- said first or second elongated portion 5, 11 comprising at least a first or second seat 101, 109 having at least a first or second seat support wall 105, 114;
- said first or second seat 101, 109 being suitable to receive said at least one first or second pad 8, 14 having a first or second pad plate 102, 111 on which a first or second pad friction material 103, 112 is placed, defining a first or second pad plane 128, 129 suitable to face and position itself substantially parallel to said first or second plane 104, 108 defined by the first or second braking surface;
- said at least one first or second pad 8, 14 being suitable to be slidably received in said at least one first or second seat 101, 109 and so as to be position itself between said first or second elongated portion 5, 11) and said first or second braking surface 3, 4 to abut, with said first or second pad plane 128, 129 thereof, against said first or second braking surface 3, 4 and to exert a braking action on the brake disc 2 when influenced by the thrust means 7 upon the demand for a first or second friction action Fa1, Fa2 exerted by the first or second pad friction material 103, 112 against said first or second braking surface 3, 4 determining a braking action;
- said first or second pad plate 102, 111 being suitable to abut against said at least one first or second seat support wall 105, 110 to release onto said caliper body 1 a first or second reaction action Fr1, Fr2 to said friction action;
- said kit further comprising said first or second insert 106, 113 in a separate body to said caliper body 1 and in a separate body to said first or second pad 8, 14 and in particular in a separate body to said first or second pad plate 102, 111;
- said first or second insert 106, 113 comprising at least one first or second plate support surface 107, 114;
- said first or second insert 106, 113 being suitable to position itself between said first or second pad seat support wall 105, 110 of said first or second seat 101, 109 provided in said first or second elongated portion 5, 11 of the caliper body 1 and said first or second pad plate 102, 111 of said first or second pad 8, 14 so as to position said first or second, plate support surface 107, 114 substantially facing said first or second pad plate 102, 111 and inclined to said first or second pad plane 128, 129;
- wherein said first or second plate support surface 107, 114 of said first or second insert 106, 113 is selectively positioned in relation to said first or second pad plate 102, 111 so as to form with said first or second pad plane 128, 129, also an obtuse angle A, when measured open in front of the first or second pad 8, 14, the extent of the angle A being selectable in a defined manner to change, also reducing it, the braking action of said first or second pad 8, 14 on said first or second braking surface 3, 4 of the brake disc 2.

According to the further embodiments described, a method of adjusting a caliper assembly 100 described above, wherein said inclination of the support surface A; A' is obtained by the replacement of the insert 106, 113.

According to the further embodiments described, adjustment method of a caliper assembly 100 as described above wherein said inclination of the support surface A; A' is obtained by adjusting the oscillation of the balance wheel 119; and/or wherein said inclination of the support surface A; A' is obtained with the controlled adjustment of the oscillation of the balance wheel 119; and/or wherein said inclination of the support surface A; A' is obtained with the controlled and feedback adjustment of the oscillation of the balance wheel 119.

| REFERENCES | |
|---|---|
| 1 | caliper body |
| 2 | brake disc |
| 3 | first vehicle side braking surface |
| 4 | opposite second wheel side braking surface |
| 5 | first vehicle side elongated portion |
| 6 | first vehicle side piston or cylinder seat |
| 7 | first piston |
| 8 | first pad |
| 9 | first vehicle side disc input end |
| 10 | second vehicle side disc output end |
| 11 | second wheel side elongated portion |
| 12 | second wheel side piston or cylinder seat |
| 13 | second piston |
| 14 | second opposite pad |
| 15 | first wheel side disc input end |
| 16 | second wheel side disc output end |
| 17 | first disc input connection bridge end |
| 18 | second disc output connection bridge end |
| 19 | housing channel of a portion of brake disc |
| 20 | brake disc sector housed in caliper body |
| 21 | first opening wheel side elongated portion |
| 22 | second opening wheel side elongated portion |
| 23 | outer caliper body wheel side |
| 24 | first closed rim first wheel side opening |
| 25 | second closed rim second wheel side opening |
| 26 | first opening vehicle side elongated portion |
| 27 | second opening vehicle side elongated portion |
| 28 | outer caliper body vehicle side |
| 29 | first closed rim first vehicle side opening |
| 30 | second closed rim second vehicle side opening |
| 31 | third cylinder vehicle side |
| 32 | third piston vehicle side |
| 33 | fourth cylinder wheel side |
| 34 | fourth piston wheel side |
| 35 | upper longitudinal rib wheel side |
| 36 | lowered central rib portion |
| 37 | lowering of the body of the wheel side elongated portion around the opening |
| 38 | brake fluid circuit |
| 39 | opening brake fluid circuit |
| 40 | drain valve |
| 41 | connector |
| 42 | connection tube |
| 43 | wheel side opening upper side rim |
| 44 | wheel side opening lower side |

REFERENCES

| | |
|---|---|
| 45 | central opening |
| 46 | axial central opening rim |
| 47 | radial opening connection bridge end |
| 48 | central opening rim |
| 49 | lower longitudinal rib |
| 50 | raised portion with cylinder outline |
| 51 | disc brake caliper |
| 100 | caliper body pad and insert assembly |
| 101 | first pad seat of caliper body |
| 102 | first pad plate |
| 103 | first pad friction material |
| 104 | first plane defined by the first braking surface |
| 105 | first pad seat support wall |
| 106 | first insert |
| 107 | first plate support surface |
| 108 | second plane defined by the second braking surface |
| 109 | second pad seat |
| 110 | second seat support wall |
| 111 | second pad plate |
| 112 | second pad friction material |
| 113 | second insert |
| 114 | second plate support surface |
| 115 | first edge portion of first plate |
| 116 | second edge portion of second plate |
| 117 | insert body |
| 118 | insert wings capable of embracing at least a portion of the pad edge |
| 119 | insert balance wheel body |
| 120 | first seat bottom wall |
| 121 | second seat bottom wall |
| 122 | first lowered portion or housing |
| 123 | second lowered portion or housing |
| 124 | balance wheel body transferor |
| 125 | plate cam |
| 126 | shaped balance wheel thrust surface |
| 127 | balance wheel actuating member |
| 128 | first pad plane |
| 129 | second pad plane |
| 130 | command panel |
| 131 | actuation line for actuator |
| 132 | actuator |
| 133 | spring |
| 134 | seger |
| 135 | vehicle |
| 136 | pump group |
| 137 | brake pedal action |
| Fa1 | first friction action |
| Fr1 | first reaction action |
| A | angle between plane defined by the braking surface and the support surface of the insert plate |

The invention claimed is:

1. A caliper assembly of a disc brake caliper with a modified braking action, the caliper assembly comprising:
a caliper body suitable to position astride a brake disc, the brake disc having a first braking surface defining a first plane;
said caliper body comprises a first elongated portion suitable to face said first braking surface of the brake disc and a thrust means housed in the first elongated portion;
said first elongated portion comprises at least one first seat having at least one first seat support wall;
said at least one first seat being suitable to receive a first pad having a first pad plate on which a first pad friction material is placed, defining a first pad plane suitable to face and be positioned substantially parallel to said first plane defined by the first braking surface;
said first pad being slidably received in said at least one first seat and configured to be positioned between said first elongated portion and said first braking surface to abut, with said first pad plane thereof, against said first braking surface and to exert a braking action on the brake disc when pressed by the thrust means upon demand for a first friction action exerted by the first pad friction material against said first braking surface causing the braking action; and
said first pad plate being suitable to abut against said at least one first seat support wall to release onto said caliper body a first reaction action to said first friction action;
said caliper assembly further comprising a first insert in a separate body from said caliper body and in a separate body to said first pad and in a separate body to said first pad plate;
said first insert comprising at least one first plate support surface;
said first plate support surface forms an abutment surface for the first pad;
said first insert interposed between said at least one first seat support wall of said at least one first seat provided in said first elongated portion of the caliper body and said first pad plate of said first pad so as to position said first plate support surface substantially facing said first pad plate and inclined in relation to said first plane defined by the first braking surface or in relation to said first pad plane; and
characterised in that
said first insert comprises a balance wheel body hinged to the caliper body and oscillating in relation to the caliper body, said first insert configured to adjust an angle between the first plate support surface of said first insert and said first plane defined by the first braking surface or said first pad plane.

2. The caliper assembly according to claim 1, wherein said caliper body further comprises a second elongated portion suitable to face a second braking surface of the brake disc opposite said first braking surface and defining a second plane;
said second elongated portion comprises at least one second seat having at least one second seat support wall;
said second seat being suitable to receive opposite a second pad having a second pad plate on which a second pad friction material is placed, defining a second pad plane suitable to face and position itself substantially parallel to said second plane defined by the second braking surface;
said second pad being slidably received in said at least one second seat and so as to position itself between said second elongated portion and said second braking surface to abut against said second braking surface and to exert a braking action on the brake disc causing a second friction action exerted by the second pad friction material against said second braking surface causing a braking action;
said second pad plate being suitable to abut against said at least one second seat support wall to release on said caliper body a second reaction action to said second friction action;
said caliper assembly further comprising a second insert in a separate body to said caliper body and in a separate body to said second pad and particular in a separate body to said second pad plate;
said second insert comprising at least one second plate support surface;
said second plate support surface forms an abutment surface for the second pad;

said second insert interposed between said second seat support wall of said second seat provided in said second elongated portion of the caliper body and said second pad plate of said second pad so as to position said second plate support surface facing said second pad plate and inclined to said second plane defined by the second braking surface or second pad plane; and wherein said second insert comprises a balance wheel body hinged to the caliper body and oscillating in relation to the caliper body said second insert configured to adjust the angle between the second plate support surface of said second insert and said second plane defined by the second braking surface or said second pad plane.

3. The caliper assembly according to claim 1, wherein said first insert is an interchangeable wedge inserted interposed between said first seat support wall and said first pad plate; and wherein said first insert is one of a series of first inserts, each of the series of first inserts being suitable to form a predefined angle with said first plane defined by the first braking surface, each of the series of first inserts capable of exerting different and selected changes in the braking action.

4. The caliper assembly according to claim 1, wherein said first insert is suitable to form a predefined acute angle with said first plane defined by the first braking surface, amplifying the braking action of said first pad on said first braking surface of the brake disc.

5. The caliper assembly according to claim 1, wherein:
said first pad plate comprises a portion of first plate edge facing said first plate support surface of said first insert; and optionally,
said portion of first plate edge facing said first plate support surface is inclined so as to be substantially parallel to said first plate support surface of said first insert.

6. The caliper assembly according to claim 1, wherein said first insert comprises an insert body forming said first plate support surface suitable to face the first pad, said insert body is connected to the caliper body, wherein:
said insert body is removably connected to the caliper body and configured to be replaced to change the braking action of the first pad on the first braking surface of the brake disc; and
said insert body comprises insert wings configured to embrace at least one portion of an edge of the first pad and to guide the first pad to abut against said first plate support surface of the first insert.

7. The caliper assembly according to claim 1, wherein said first plate support surface of said first insert is selectively positioned in relation to the caliper body, or said first pad plate, to form a first obtuse angle between said first plate support surface and said first plane defined by the first braking surface, or said first pad plane, an extent of the first obtuse angle being selectable in a defined manner to change the braking action of said first pad on said first braking surface of the brake disc;
a second plate support surface of a second insert is selectively positioned in relation to the caliper body, or a second pad plate, to form a second obtuse angle between said second plate support surface and a second plane defined by a second braking surface, or second pad plane, an extent of the second obtuse angle being selectable in a defined manner to change the braking action of a second pad on second braking surface of the brake disc;

a pad seat comprises a seat bottom wall and/or a seat support wall in which a lowered portion or a housing is made, in which said balance wheel body is housed, and optionally housing oscillating means;
said balance wheel body projects or recesses while oscillating in said lowered portion or housing at least with a transferor shaped portion thereof following said plate support surface; and
said pad plate comprises a cam-shaped plate portion forming a cam surface which, in any generatrix thereof forms a plate edge portion which forms said angle between the plate support surface of the balance wheel body and said plane defined by the braking surface or pad plane,
said balance wheel body comprises a shaped balance wheel thrust surface influenced by an actuating member.

8. The caliper assembly according claim 1, wherein a balance wheel works with a transferor surface thereof abutting against the first plate support surface, said first plate support surface being cam-shaped so as to orient the thrust, during rotation of the balance wheel, according to a predefined direction.

9. A method of adjusting a caliper assembly, comprising:
providing a caliper assembly having the characteristics of claim 7;
obtaining an inclination of the support surface by performing at least one of:
adjusting the oscillation of the balance wheel;
controllably adjusting the oscillation of the balance wheel; or
providing a feedback adjustment of the oscillation of the balance wheel.

10. The caliper assembly according to claim 2, wherein:
said first insert is an interchangeable wedge inserted interposed between said first seat support wall and said first pad plate;
said second insert is an interchangeable wedge inserted interposed between said second seat support wall and said second pad plate;
said caliper assembly comprises a series of first inserts, each suitable to form with said first plane defined by the first braking surface a different and predefined angle, providing a kit for setting the caliper assembly capable of exerting different and selected braking action changes; and
said caliper assembly comprises a series of second inserts, each suitable to form with said second plane defined by the second braking surface a different and predefined angle, providing a kit for setting the caliper assembly capable of exerting different and selected braking action changes.

11. The caliper assembly according to claim 2, wherein:
said first insert is suitable to form a predefined acute angle with said first plane defined by the first braking surface a predefined acute angle, to change, the braking action of said first pad on said first braking surface of the brake disc; and
said second insert is suitable to form a predefined acute angle with said second plane defined by the second braking surface a predefined acute angle to change, the braking action of said second pad on said second braking surface of the brake disc.

12. The caliper assembly according to claim 2, wherein:
said first pad plate comprises a portion of first plate edge facing said first plate support surface of said first insert, said portion of first plate edge facing said first plate support surface is inclined so as to be substantially parallel to said first plate support surface of said first insert;

said second pad plate comprises a portion of second plate edge facing said second plate support surface of said second insert; and said portion of second plate edge facing said second plate support surface is inclined so as to be substantially parallel to said second plate support surface of said second insert.

13. The caliper assembly according to claim 2, wherein:

said first insert comprises an insert body forming said first plate support surface suitable to face the first pad, said insert body is connected to the caliper body;

said second insert comprises an insert body forming said second plate support surface suitable to face the second pad, said insert body is connected to the caliper body;

said insert body is removably connected to the caliper body of the caliper assembly and configured to change the braking action of the pad on the braking surface of the brake disc; and said insert body comprises insert wings configured to embrace at least one portion of the pad and guide the pad to abut against said plate support surface of the insert.

14. The caliper assembly according to claim 2, wherein said second pad plate comprises a portion of second plate edge facing said second plate support surface of said second insert, and/or wherein said portion of second plate edge facing said second plate support surface is inclined so as to be substantially parallel to said second plate support surface of said second insert.

15. The caliper assembly of claim 8, wherein the predefined direction is a direction forming a predefined angle in relation to said first pad plane or second pad plane.

16. A kit comprising at least one pad and an insert suitable to be received in a caliper body assembly, said caliper body assembly comprising:

a caliper body suitable to be positioned astride a brake disc, the brake disc having a first braking surface defining a first plane or second braking surface defining a second plane;

said caliper body comprising a first elongated portion suitable to face said first braking surface of the brake disc or a second elongated portion suitable to face said second braking surface of the brake disc comprising thrust means housed therein;

said first elongated portion comprising at least one first seat having at least one first seat support wall;

said second elongated portion comprising at least one second seat having at least one second seat support wall;

said first seat being suitable to receive at least one first pad having a first pad plate on which a first pad friction material is placed, defining a first pad plane suitable to face and be positioned substantially parallel to said first plane defined by the first braking surface;

said second seat being suitable to receive at least one second pad having a second pad plate on which a second pad friction material is placed, defining a second pad plane suitable to face and be positioned substantially parallel to said second plane defined by the second braking surface;

said at least one first pad being suitable to be slidably received in said at least one first seat and so as to be positioned between said first elongated portion and said first braking surface to abut, with said first pad plane thereof, against said first braking surface and the exert a braking action on the brake disc when influenced by the thrust means upon a demand for a first friction action exerted by the first pad friction material against said first braking surface determining a braking action;

said at least one second pad being suitable to be slidably received in said at least one second seat and so as to be positioned between said second elongated portion and said braking surface to abut, with said second pad plane thereof, against said second braking surface and to exert a braking action on the brake disc when influenced by the thrust means upon the demand for a second friction action exerted by the second pad friction material against said second braking surface determining a braking action;

said first pad plate being suitable to abut against said at least one first seat support wall to release onto said caliper body a first reaction to said first friction action;

said second pad plate being suitable to abut against said at least one second seat support wall to release onto said caliper body a second reaction action to said second friction action;

said kit further comprising a first insert in a separate body to said caliper body and in a separate body to said first pad and in particular in a separate body to said first pad plate or a second insert in a separate body to said caliper body and in a separate body to said second pad and in particular in a separate body to said second pad plate;

said first insert comprising at least one first plate support surface;

said first plate support surface forms an abutment surface for the first pad;

said first insert being suitable to be positioned between said first seat support wall of said first seat provided in said first elongated portion of the caliper body and said first pad plate of said first pad so as to position said first plate support surface substantially facing said first pad plate and inclined to said first pad plane;

said kit further comprising said first insert in a separate body to said caliper body and in a separate body to said first pad and in particular in a separate body to said first pad plate;

said second insert comprising at least one second plate support surface;

said second insert being suitable to position itself between said second seat support wall of said second seat provided in said second elongated portion of the caliper body and said second pad plate of said second pad so as to position said second plate support surface substantially facing said second pad plate and inclined to said second pad plane; and characterised in that each of said first inserts and/or second inserts comprises a balance wheel body hinged to the caliper body and oscillating in relation to the caliper body so as to adjust an angle between the plate support surface of said insert and said plane defined by the braking surface or said pad plane.

17. The kit according to claim 16, wherein said first plate support surface of said first insert is selectively positioned in relation to said first pad plate so as to form a first obtuse angle between said first plate support surface and said first pad plane, an extent of the first obtuse angle being selectable in a defined manner to change, the braking action of said first pad on said first braking surface of the brake disc; and wherein said second plate support surface of said second insert is selectively positioned in relation to said second pad plate so as to form a second obtuse angle between said second plate support surface and said second pad plane, an extent of the second obtuse angle being selectable in a defined manner to change the braking action of said second pad on said second braking surface of the brake disc.

* * * * *